Patented June 22, 1926.

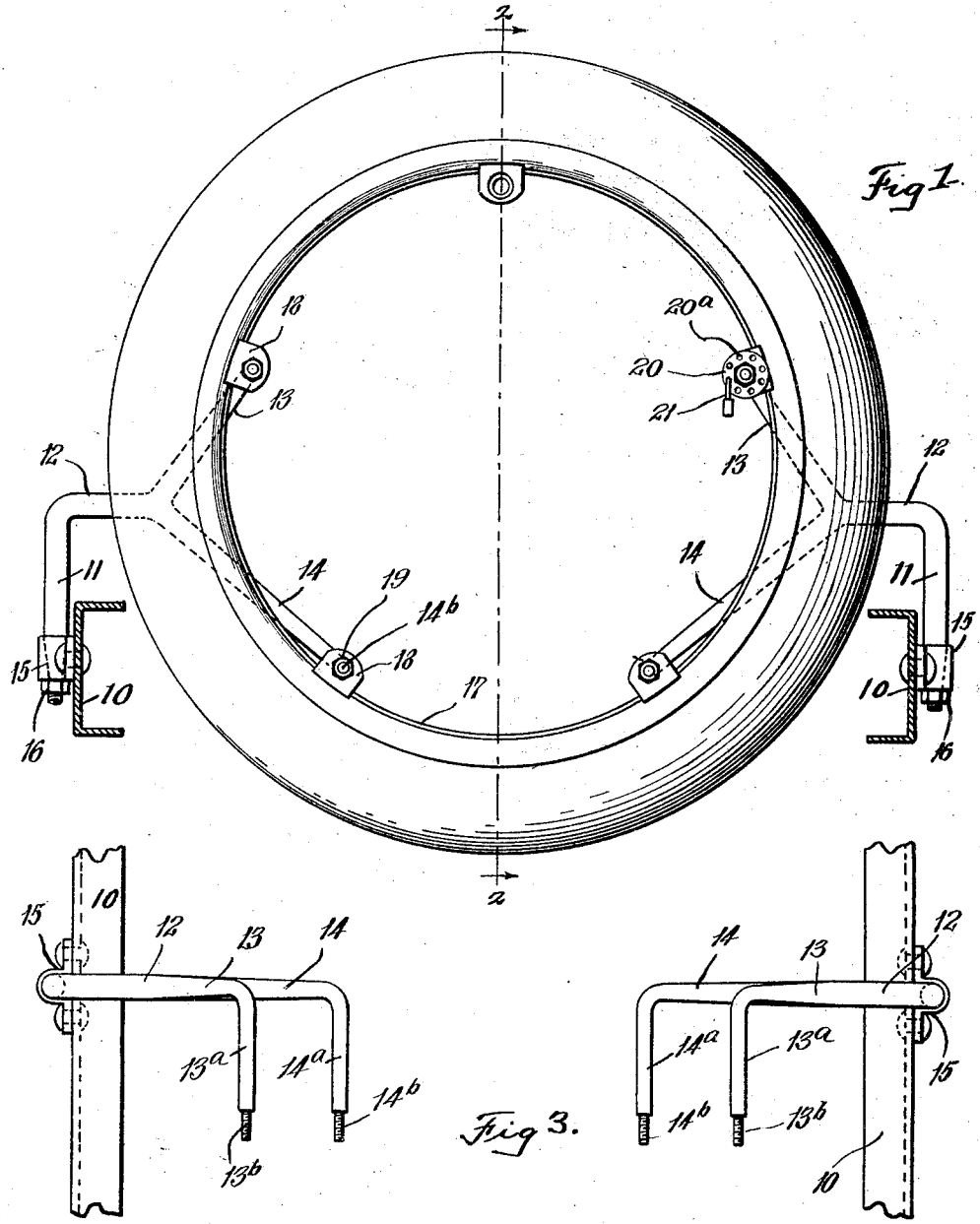

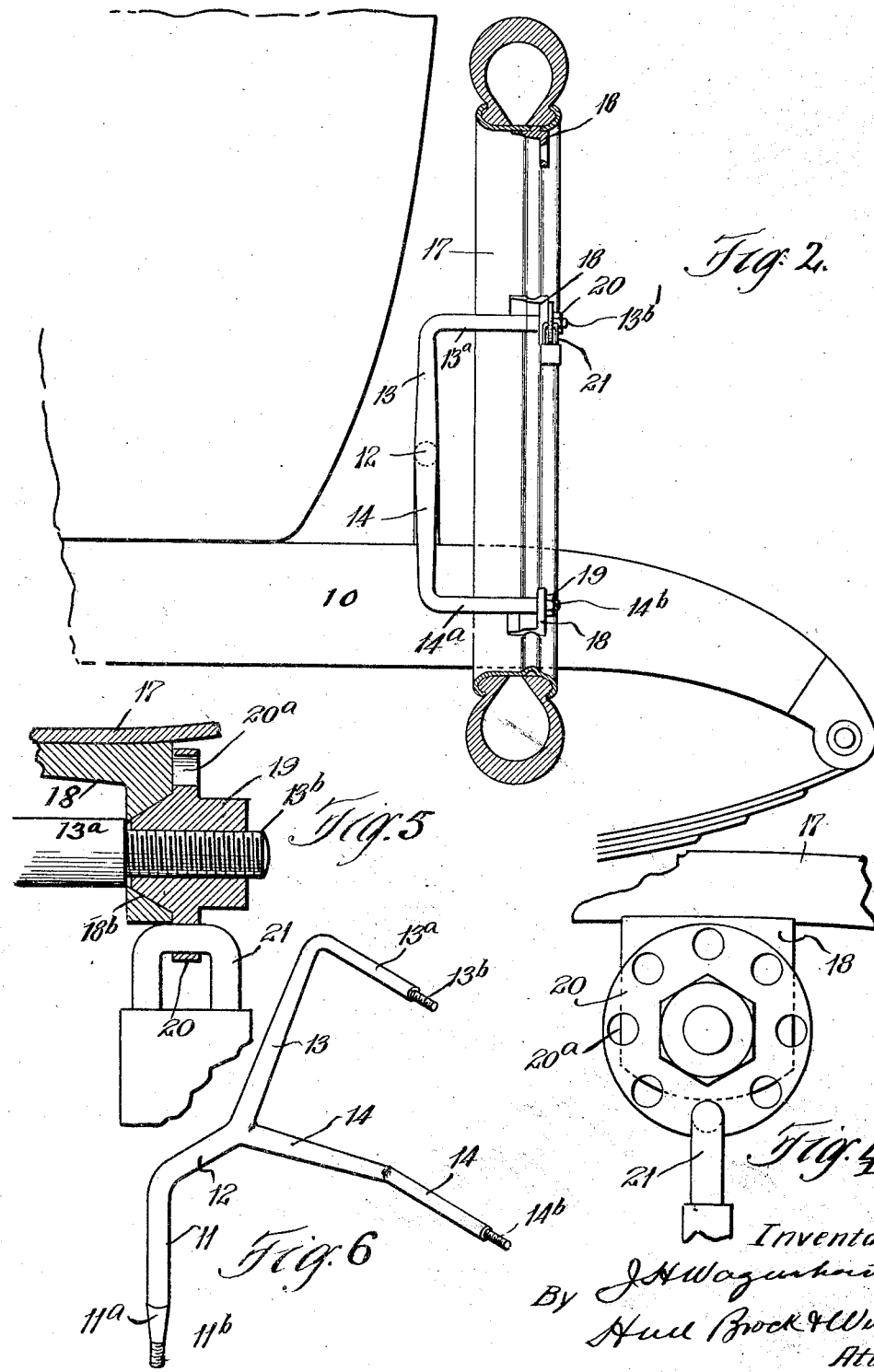

1,590,140

UNITED STATES PATENT OFFICE.

JAMES H. WAGENHORST, OF JACKSON, MICHIGAN.

TIRE CARRIER.

Application filed March 22, 1924. Serial No. 701,084.

This invention relates generally to tire carriers for automobiles and more particularly to one for use in connection with a tire carrying rim having radial inwardly projecting apertured lugs permanently attached to said rim.

Tire carriers as usually constructed employ a supporting band to receive the tire carrying rim.

One object of the present invention is to do away with the supporting band, and therefore provide a tire carrier which is lighter than tire carriers in common use inasmuch as fewer parts are employed.

My present form of tire carrier will also be simpler and cheaper to make and furthermore the supporting bands heretofore used in tire carriers are liable to get out of true and my construction of tire carrier avoids this difficulty inasmuch as no supporting bands are used.

Another advantage of my improved construction is that it can be easily applied to any and all makes of frame having rearwardly extending frame members.

Other objects and advantages of the invention will become apparent as the description proceeds.

The invention consists in the novel features of construction and in the manner of combining or arranging the same, all of which will be fully described hereinafter and set forth in the appended claims.

In the drawings forming part of this specification, Fig. 1 is a rear elevation of a tire carrier constructed in accordance with my invention, the side members of the frame of the automobile being shown in section; Fig. 2 is a sectional elevation on the line 2—2 of Fig. 1; Fig. 3 is a plan view of the side members of the frame with my improved tire carrier connected thereto, the rim with tire connected thereto being removed from the carrier; Fig. 4 is an enlarged face view of the rim locking means; Fig. 5 is a sectional view of the same; and Fig. 6 is a detail perspective view of one half of the tire carrier detached from the frame.

Referring to the drawings 10, 10 indicate the side members of the automobile frame and connected to these members are the tire carrying members, said members comprising each the upright portion 11 and the horizontal portions 12, these portions 12 extending towards each other as shown. The portions 12 terminate in diverging arms or branches 13 and 14, the arms or branches 14 being preferably slightly longer than the arms or branches 13. Each arm or branch is bent horizontally rearwardly as shown at 13$^a$ and 14$^a$; and each arm portion 13$^a$ and 14$^a$ terminates in a reduced and threaded stud 13$^b$ and 14$^b$. Socket clips 15 are attached to the side members 10 at opposite points, the lower end of each upright member 11 is tapered as shown at 11$^a$ to fit into the taper of the socket, and the extreme end is threaded as shown at 11$^b$ to receive the nut 16 by means of which the upright member 11 is drawn tightly into the socket and securely fastened. The tire carrying rim 17 may be of the clencher or straight side type but whatever its construction may be it is provided with a plurality of radial inwardly projecting lugs 18, the radial inwardly projecting portion of each lug being apertured as shown at 18$^b$, and when the rim is placed upon the carrier the threaded studs 13$^b$ and 14$^b$ project through the apertured lugs. The shoulders at the ends of the arm portions 13$^a$ and 14$^a$ serve as stops to limit the forward movement of the tire as most clearly shown in Fig. 5. In order to securely fasten the tire upon the carrier, nuts 19 are employed, the inner faces of said nuts being coned or tapered to engage the counterbored openings in the lugs as most clearly shown. Any desired number of lugs may be attached to the rim and in practice it is usual to employ five such lugs and four threaded studs will be ample to securely fasten the rim to the tire carrier. It will be understood that the lugs 18 are permanently attached to the rim and the arms 13 and 14 and their rearwardly extending portions 13$^a$ and 14$^a$ are so proportioned and positioned as to bring the studs 13$^b$ and 14$^b$ into the proper relative positions for fitting four of the attached lugs of the rim thereon.

In order to securely lock the rim upon the carrier, and prevent the same being stolen I prefer to make one of the nuts with an annular flange 20, said flange having a plurality of apertures 20$^a$ produced therein and the hasp or shackle 21 of a suitable lock can be passed through one of these openings thereby preventing the rotation of the nut. By preventing the rotation of the nut it is of course obvious that it will be impossible to remove the nut from the threaded stud and so long as the rim is secured to the carrier at at least one point, it will be impossible to remove the rim from the carrier.

It will thus be seen that I provide an exceedingly simple and highly efficient construction of tire carrier which is particularly adapted for use in connection with tire carrying rims having permanently attached apertured lugs. A tire carrier constructed as herein shown and described can be quickly and easily attached to any of the automobiles having parallel side frame members and the carrier sections can be attached at any desired point at the rear of the automobile body. All of the various objections to the circular band ordinarily employed in tire carriers are therefore avoided by the simple construction of tire carrier above set forth.

Having thus described my invention, what I claim is:—

1. The combination with a vehicle, of a plurality of forked members connected thereto, said forked members each carrying a threaded stud, of a tire carrying rim having apertured lugs permanently connected thereto, said threaded studs being so positioned that they enter the apertures of the attached lugs and nuts screwed upon the projecting ends of said studs.

2. The combination with a vehicle, of forked members connected thereto and provided with rearwardly projecting threaded studs, of a demountable tire carrying rim provided with apertured lugs permanently connected thereto, said rim being supported on said members, the threaded studs projecting through said apertured lugs, nuts screwed upon the projecting ends of said studs, one of said nuts having an apertured flange, and a locking device connected to said apertured flange.

3. The combination with a vehicle, of members connected thereto, said members each comprising a vertical portion and a horizontal portion, said horizontal portion having angular diverging arms terminating in threaded studs, of a demountable rim having apertured lugs permanently attached thereto, said rim being arranged upon the arms, the threaded studs projecting through the apertured lugs, nuts upon said studs and engaging said lugs, and means for locking one of said nuts against rotation.

4. The combination with a demountable tire carrying rim having radially inwardly projecting apertured lugs permanently attached thereto, of threaded studs passing through a plurality of said apertured lugs, arms to which said studs are connected, suitable supports for said arms, and nuts upon said studs and engaging said lugs to securely connect the rim to the arms.

5. The combination with the frame members of a motor vehicle, of oppositely disposed forked members connected to said frame members, and projecting toward each other and rearwardly, said forked members terminating in threaded studs at their rear ends, and a demountable tire carrying rim having radial inwardly projecting apertured lugs attached to said rim, said rim being arranged upon the members, the studs projecting through said lugs, and nuts upon the projecting ends of said studs.

6. A carrier for demountable rims having attached thereto apertured securing lugs comprising a pair of brackets carried by the vehicle, each bracket having an upwardly-extending portion and a forked laterally extending portion, the branches of said forked portion being turned rearwardly parallel to each other and so spaced as to be adapted to pass through apertures of certain lugs of the rim, the said rearwardly turned portions being threaded, and nuts screwed on said portions and adapted to engage the lugs.

7. A carrier bracket for demountable rims having attached thereto apertured securing lugs, comprising an upright stem portion and a laterally-turned portion which is forked to provide diverging arms, the ends of said arms being bent rearwardly and provided with threaded stud portions so spaced as to be adapted to extend through certain lugs of said rim, and nuts screwed on said stud portions and adapted to engage said lugs.

8. A carrier bracket for demountable rims having attached thereto apertured securing lugs, comprising an upright stem portion and a laterally-turned portion which is forked to provide diverging arms, the ends of said arms being bent rearwardly and provided with threaded stud portions so spaced as to be adapted to extend through certain lugs of said rim, said arms having shoulders at the bases of said stud portions on which the lugs are adapted to seat.

In testimony whereof, I hereunto affix my signature.

JAMES H. WAGENHORST.